Patented Apr. 13, 1937

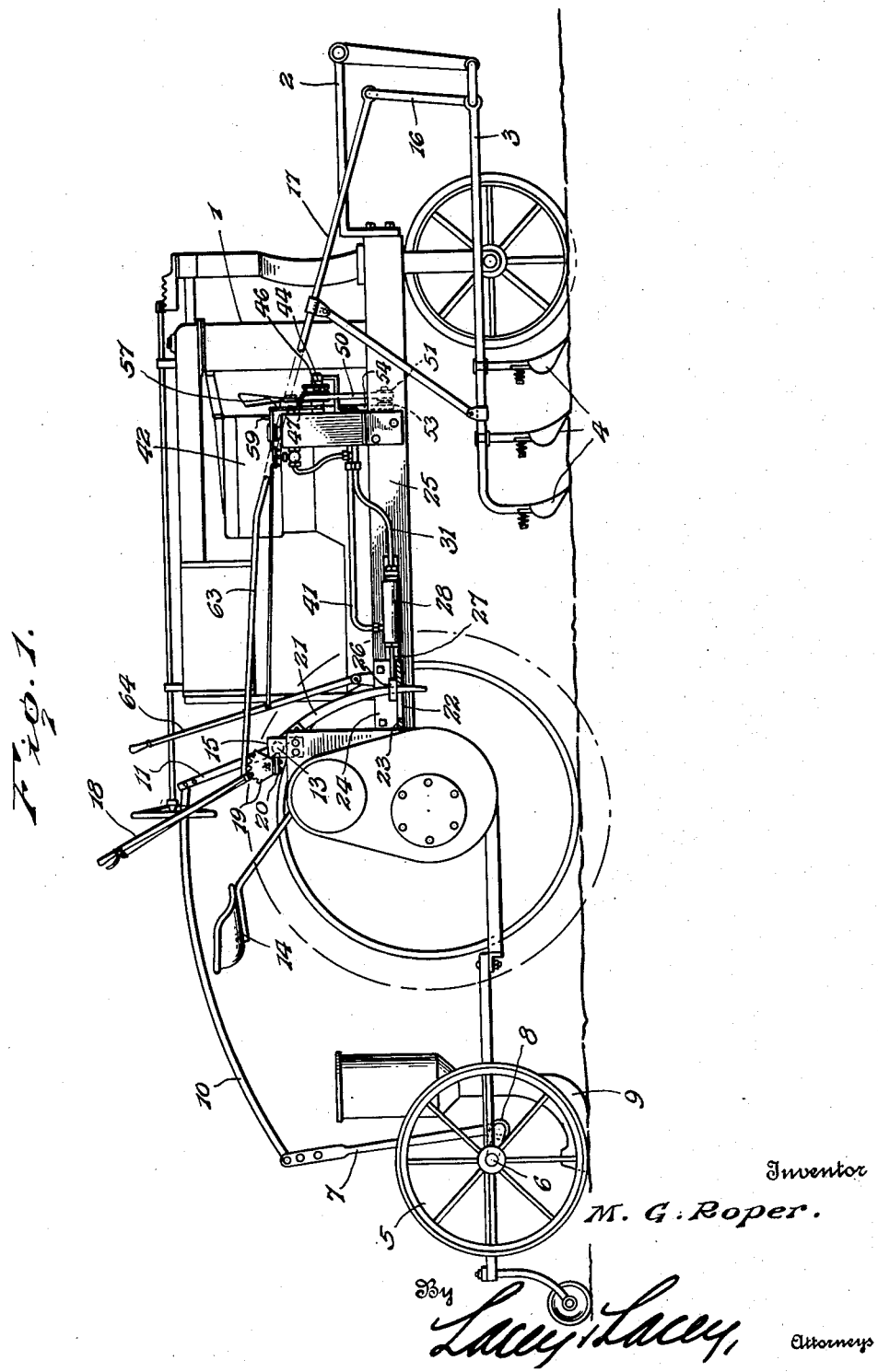

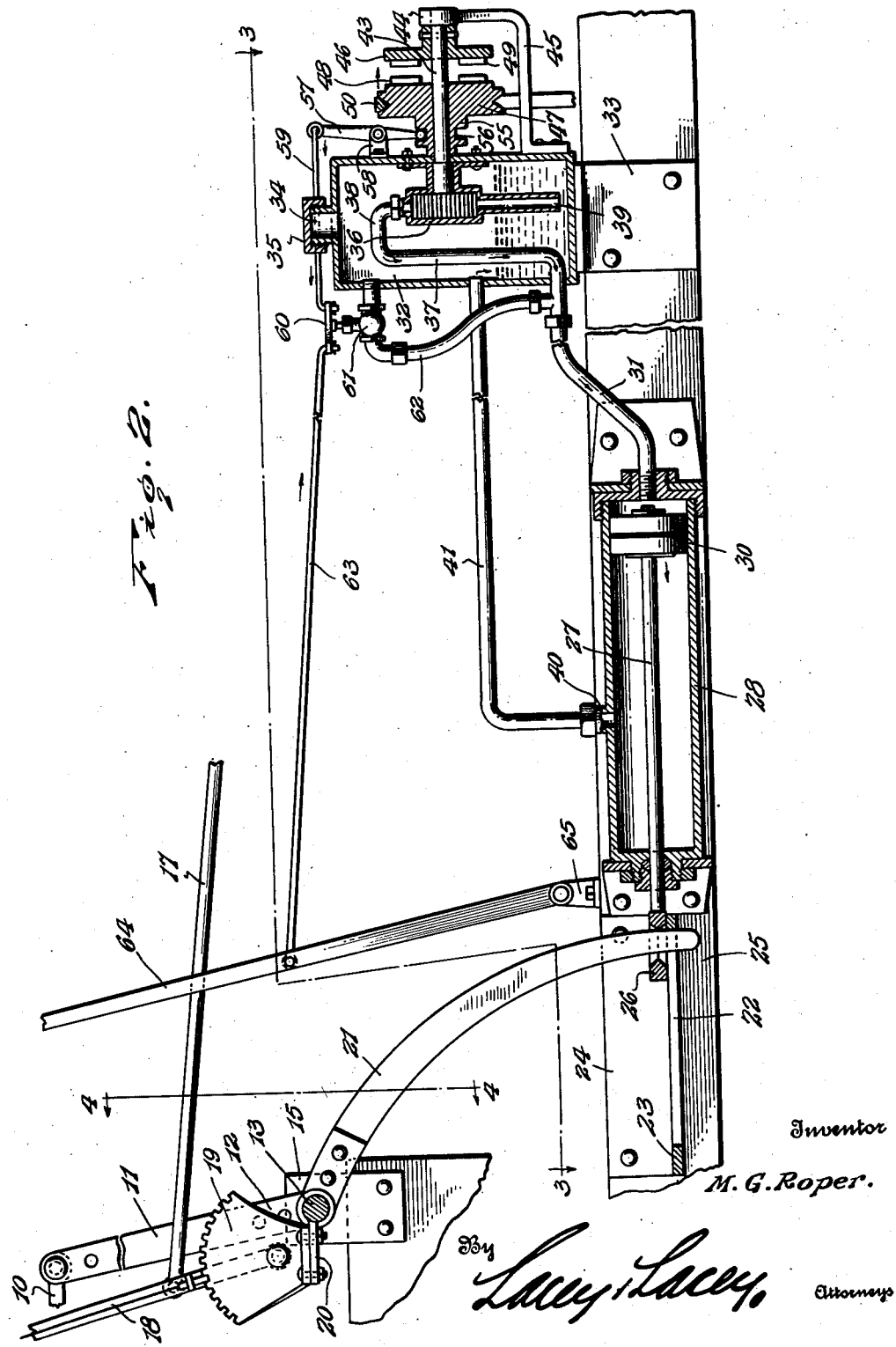

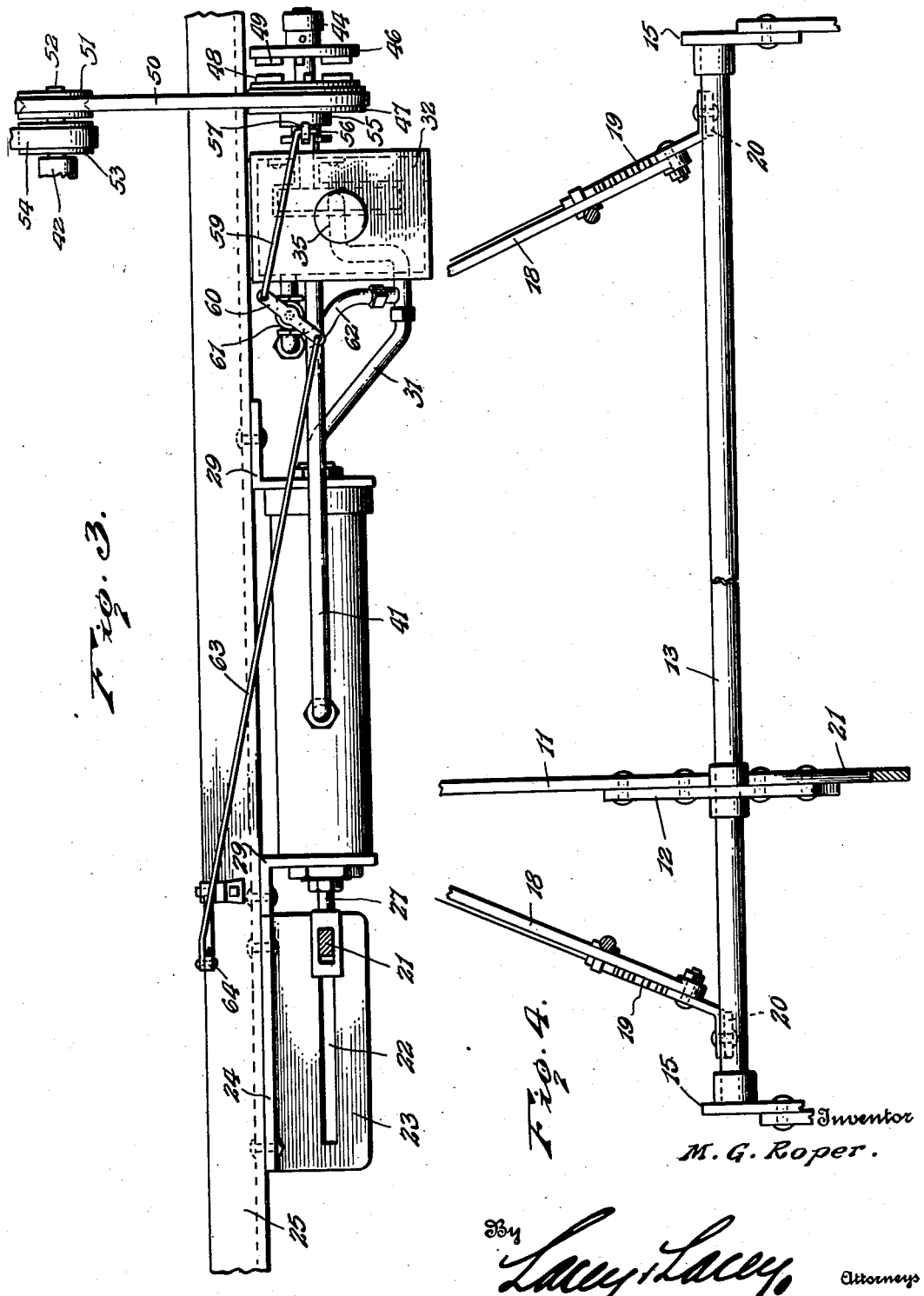

2,076,673

UNITED STATES PATENT OFFICE 2,076,673

POWER LIFT

Marion G. Roper, Winters, Tex.

Application December 21, 1935, Serial No. 55,674

4 Claims. (Cl. 97—50)

This invention relates to agricultural implements and more particularly to a power lift constituting an accessory for an agricultural implement and serving as means whereby the planter and a cultivator operatively associated with a tractor may be vertically adjusted and supported either in an operative position or in an elevated position out of engagement with the ground.

Another object of the invention is to so construct the hoist that it may be actuated by power obtained from the engine of the tractor and thus making it unnecessary to provide a special motor for actuating the hoist.

Another object of the invention is to permit the hoist when actuated to raise the shovels of the cultivator and planter to a desired height above the ground and, in addition, permit the cultivator and planter to be manually adjusted, as well as by means of the power lift, and thus accurately regulate the extent to which the shovels enter the ground when in a lowered position.

Another object of the invention is to provide an apparatus of this character which can be very easily applied to a tractor of a conventional construction and operatively associated with a cultivator and a planter of a conventional construction carried by the tractor.

The invention is illustrated in the accompanying drawings, wherein

Figure 1 is a view showing the improved power lift applied to a tractor of a conventional construction and having a cultivator and a planter connected thereto.

Figure 2 is an enlarged fragmentary view showing the improved power lift partially in side elevation and partially in vertical section.

Figure 3 is a view taken along the line 3—3 of Figure 2 and showing the power lift in top plan.

Figure 4 is a fragmentary view taken along the line 4—4 of Figure 2.

The tractor, which is indicated in general by the numeral 1, is of a conventional construction and has a cultivator 2 of a conventional construction mounted at its front which includes a frame 3 at each side of the tractor carrying depending shovels 4 for opening the ground as the cultivator moves forwardly with the tractor. A planter 5 is mounted at the rear of the tractor and this implement is also of a conventional construction having an axle 6 of crank shaft formation engaged by a latch lever 7 so that when the lever is moved to an adjusted position the shaft will be turned in the usual bearings 8 and the furrow opener 9 of the planter vertically adjusted. At the present time, it is customary to operatively connect cultivators and planters with tractors and vertically adjust the planter and the blade carrying frames of the cultivator by means of levers mounted upon the tractor and actuated by the operator of the tractor. This has been found unsatisfactory as a great deal of effort is required to move the levers due to the weight of the vertically shiftable portions of the planter and the cultivator. In the present construction, there has been provided a bar 10 which extends forwardly from the upper end of the lever 7 and has its forward end pivoted to a lever 11 fixed to a bracket 12 carried by a shaft 13 extending transversely across the tractor in front of the driver's seat 14. This shaft is mounted in bearing brackets 15 carried by the frame of the tractor at opposite sides thereof and it will be readily understood that when the shaft 13 is rotated in one direction, the lever 7 will be moved to shift the planter upwardly, whereas when the shaft is rotated in an opposite direction, the planter will be lowered and its blade 9 caused to enter the ground a desired distance. The blade carrying frames 3 of the cultivator are pivotally mounted at their forward ends and carry upstanding arms 16 engaged by bars 17 extending rearwardly at opposite sides of the tractor. Rear ends of the bars are pivoted to latch levers 18 carried by racks 19 which are bolted or otherwise firmly secured to brackets 20 carried by and extending rearwardly from the shaft 13 and by an inspection of Figures 1 and 2 it will be readily seen that when the shaft 13 is rotated in one direction, the bars 17 will be shifted forwardly to swing the frames 3 upwardly and move the blades 4 out of the ground, whereas when the shaft 13 is rotated in an opposite direction, rearward pull will be exerted upon the bars 17 and the frames 3 swung downwardly to cause the cultivator blades to enter the ground. Since the levers 18 are latch levers pivoted to the racks 19, they may be manually adjusted to cause the blades 4 to enter the ground the desired distance when the frames 3 are lowered by rotation of the shaft 13 its full extent in the last-mentioned direction.

The mechanism, by means of which rotation of the shaft 13 is controlled, is carried by the tractor at one side thereof, as shown in Figure 1, and operatively associated with a lever or arm 21 which is curved longitudinally and extends downwardly at a forward incline from the lower arm of the bracket 12 with its lower end extending through a slot 22 formed longitudinally in a plate or bracket 23. This bracket or plate 23 extends horizontally and is formed with an attaching flange 24 bolted or otherwise rigidly secured against the outer side face of the adjacent chassis bar 25 of the tractor. The arm or lever 21 also extends through an opening formed in the head 26 of a rod 27 projecting from one end of a cylinder 28. This rod 27 extends longitudinally in the cylinder which is firmly secured against the chassis bar 25 by brackets 29 and at its inner end carries a piston 30. It will thus be seen that when the piston is moved longitudinally in the cylinder toward the rear end thereof by fluid entering the front end of the cylinder through the pipe 31, the lever 21 will be swung rearwardly by the rearwardly moving piston rod and the shaft 13 rotated to swing the levers 11 and 15 forwardly. As these levers move forwardly, the bar 17 will be forced forwardly to swing the cultivator frames 3 upwardly and move the cultivator blades out of the ground and at the same time pull will be exerted upon the bar 10 by the lever 11 to vertically adjust the planter. As the lever 21 is at all times engaged in the slot 22, it cannot become disconnected from the head 26 of the piston rod and, therefore, rotary motion will always be transmitted to the shaft 13 when the piston is moved rearwardly and when fluid is released from the forward portion of the cylinder and the piston moved forwardly by the weight of the frames 3 and the cultivator moving them downwardly there will be no danger of the lever 21 slipping out of the head 26. The fact that the piston forces fluid out of the cylinder through the pipe 31 as it moves forwardly will prevent the cultivator frames and the planter from moving too rapidly as they move downwardly.

The fluid which is supplied to the cylinder to force the piston rearwardly may be oil or any other desired liquid and is contained in a receptacle or reservoir 32 mounted upon a bracket 33 secured to the chassis bar 25 in front of the cylinder. This container or receptacle extends vertically and at its upper end is provided with a filling neck 34 normally closed by a cap 35 so that liquid can be poured into the receptacle when necessary. A rotary pump 36 is mounted in the receptacle by being secured against the front wall thereof and the pipe or tube 31 also enters this receptacle near its bottom. Within the receptacle the tube or pipe is extended upwardly, as shown at 37, and then forwardly, as shown at 38, and downwardly with its front end coupled to the outlet at the upper end of the casing of the rotary pump. The inlet tube or pipe 39 of the pump extends downwardly from the pump casing and terminates close to the bottom of the receptacle. Therefore, when the pump is in operation, oil may be drawn upwardly from the bottom of the casing to the pump and forced through the tube or pipe 31 into the forward end of the cylinder to move the piston rearwardly. This piston is forced rearwardly until it passes an outlet port 40 leading upwardly from the cylinder intermediate the length thereof at which time the oil will pass through this outlet port and flow through the pipe or tube 41 leading forwardly to the receptacle and entering the same through the rear wall thereof. The level of the oil in the receptacle is below the pipe 41 and, therefore, a good circulation may take place and while the piston will be held against forward movement, there will be no danger of the piston being forced rearwardly to such an extent that the mechanism will be broken.

The pump is to be driven from the motor 42 of the tractor and, therefore, the shaft 43 of the rotary pump projects forwardly from the receptacle and has its front end mounted in the bearing 44 provided at the upper end of a bracket 45. This bracket is preferably secured to the tank or receptacle, as shown in Figure 2, but may be secured to any convenient support and the shaft carries a clutch disc 46 which is fixed thereto and also a pulley 47 which turns freely upon the shaft and has clutch elements 48 for engaging the companion clutch elements 49 carried by the disc 46. It will thus be seen that when the pulley is shifted forwardly along the shaft to move its clutch elements into engagement with the clutch elements of the disc 46, the shaft 43 will be rotated and the pump set in operation. The belt 50, by means of which rotary motion is transmitted to the pulley 47, engages about a pulley 51 fixed upon the shaft 52 of the engine forwardly of the pulley 53 engaged by the fan belt 54. Therefore the pulley 47 will be rotated whenever the engine of the tractor is in operation but the pump 36 will only be set in motion during the time the pulley is shifted forwardly into position for engagement with the clutch disc. This pulley 47 has its hub 55 extended rearwardly and formed with a groove 56 for engagement by forks at the lower end of a lever 57 disposed vertically and pivoted to a bracket 58 carried by the receptacle. At its upper end the lever 57 is engaged by a link or rod 59 extending forwardly from one end of a cross head 60 carried by the stem of a valve 61 mounted in a branch pipe 62 leading from the pipe 31 and entering the receptacle near the upper end thereof. The other end of the cross head is engaged by a rod 63 extending forwardly from an operating lever 64 pivoted to a bracket 65 and disposed in front of the shaft 13 in such position that it may be easily grasped by the operator of the tractor. When the operating lever is shifted forwardly to move the cross head in a direction to close the valve 61, pull will be exerted upon the rod 59 to rock the lever 57 about its pivot and move the pulley 55 forwardly into engagement with the clutch disc 49 and thus cause the pump to be set in motion. Oil will then be forced through the pipe 31 into the cylinder 28 to move the piston rearwardly until it passes the port 40, at which time oil will flow through the pipe 41 back into the receptacle. The cultivator frames will thus be swung upwardly to an elevated position and the planter also vertically adjusted and maintained in the vertically adjusted position as the oil in the forward portion of the cylinder will prevent return movement of the piston. When it is desired to lower the cultivator frames and return the planter to its original position, it is merely necessary to draw the lever 64 rearwardly and thus move the cross head in a direction to open the valve 61 and actuate the lever 57 to move the pulley 47 away from the clutch disc. The valve 61 being open, the oil in the pipe 31 and the forward portion of the cylinder will no longer be held under compression and may be forced through the branch pipe 62 and into the upper end of the receptacle. Therefore, weight of the cultivator frames and the vertically shiftable portion of the planter may return them to the normal position in which the blades enter the ground. As the pump is only operated when the clutch members of the pulley 47 are in engagement with the clutch members of the disc 46, the pump will not be operated except when vertically adjusting the planter and the cultivator, although the pulley 47 will continue to rotate as long as the motor of the tractor is in operation. It will thus be seen that by means of this power lift the cultivator and the planter may be very easily vertically adjusted and maintained in an elevated position.

Having thus described the invention, what is claimed as new is:

1. In an agricultural implement, a tractor, a cultivator carried by said tractor, a planter carried by the tractor, manually operated means for vertically adjusting the planter and the cultivator, and power operated means for vertically adjusting the cultivator and the planter including a rotatably mounted rock shaft, an arm extending downwardly from the rock shaft, a horizontal cylinder, a piston slidable in said cylinder and having a rod extending from the cylinder and having an eye at its outer end slidably receiving the lower end portion of said arm whereby longitudinal movement of said piston rod will impart swinging movement to the arm and rotate the rock shaft, a container, means for circulating fluid between the container and cylinder to shift the piston longitudinally in the cylinder including a pump having a rotary drive shaft, means for transmitting rotary motion to the drive shaft of the pump from the motor of the tractor, and means for controlling rotation of the drive shaft by the last-mentioned means including an actuating lever carried by the tractor.

2. In combination with a tractor and agricultural implements associated therewith, means for vertically adjusting the agricultural implements including a rocker shaft carried by the tractor, an arm extending from the rocker shaft, a cylinder, a piston in said cylinder having a rod extending therefrom and engaged with said arm, a container, a rotary pump in said container having a drive shaft extending from the container, a pipe leading from the pump to said cylinder whereby fluid may be delivered into the cylinder and imparting movement to said piston in one direction, a return pipe leading from the cylinder to said casing, a branch pipe leading from the first pipe to the cylinder whereby fluid may flow back through the first pipe and branch pipe into the container when the piston moves in the opposite direction, means for imparting rotary motion to the pump shaft from the motor of the tractor, and means for controlling rotation of the pump shaft and flow of fluid through the branch pipe.

3. A tractor having agricultural implements associated therewith and power operated means for vertically adjusting the agricultural implements including a rocker shaft having an arm extending therefrom, a cylinder having a piston slidable therein and provided with a piston rod extending from the cylinder and engaged with said arm, a container, a pump in said container having a rotary drive shaft extending from the container, a pipe leading to said cylinder for delivering fluid under pressure into the cylinder and moving the piston and its piston rod in one direction, a branch pipe extending from said pipe to said container whereby fluid may flow back through the first pipe and branch pipe into the container when the piston moves in an opposite direction, a valve for the branch pipe, an overflow pipe leading from the cylinder to the container, a clutch member carried by the pump shaft, a pulley loose upon the pump shaft and adapted to receive rotary motion from the motor of the tractor, a lever for moving said pulley into and out of gripping engagement with the clutch member of the shaft, an operative connection between the lever and valve for moving the pulley into engagement with the clutch member when the valve is closed and moving the pulley away from the clutch member when the valve is opened, and manually operated means for opening and closing said valve.

4. A tractor having a vertically adjustable agricultural implement associated therewith, and power operated means for vertically adjusting the agricultural implement including a rocker shaft, an arm for controlling rotation of the rocker shaft, a cylinder, a piston in the cylinder having a rod extending from the cylinder and engaged with said arm, a container mounted upon said tractor, a pump in said container having a rotary drive shaft projecting from the container, a pipe leading from said pump to said cylinder for delivering fluid into the cylinder and effecting sliding of the piston in one direction and rotating the rocker shaft to effect vertical adjustment of the agricultural implement, an overflow pipe leading from the cylinder to the container above the normal level of liquid in the container, a branch pipe leading from the first pipe to the upper portion of the container, a valve for the branch pipe, a cross arm carried by the stem of said valve, a clutch member fixed to the pump shaft, a pulley loose upon the pump shaft having clutch elements for engaging the clutch member of the shaft when the pulley is shifted toward the clutch member of the shaft, a lever pivotally mounted and having one end portion engaging said pulley, a link connecting the other end of said lever with one end of the cross head of said valve, an adjusting lever carried by said tractor, and a rod connecting said adjusting lever with the other end of the cross head of the valve.

MARION G. ROPER.